United States Patent
Kang et al.

(10) Patent No.: US 9,965,071 B2
(45) Date of Patent: *May 8, 2018

(54) DISPLAY DEVICE AND DRIVING METHOD THEREOF

(71) Applicant: LG Display Co., Ltd., Seoul (KR)

(72) Inventors: Seong Kyu Kang, Paju-si (KR); Hoon Bae Kim, Goyang-si (KR); Sung Yub Lee, Busan (KR)

(73) Assignee: LG Display Co., Ltd., Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/016,250

(22) Filed: Feb. 4, 2016

(65) Prior Publication Data

US 2016/0188065 A1   Jun. 30, 2016

Related U.S. Application Data

(63) Continuation of application No. 14/726,062, filed on May 29, 2015, now Pat. No. 9,285,913.

(30) Foreign Application Priority Data

Dec. 31, 2014   (KR) .......................... 10-2014-0196073

(51) Int. Cl.
*G06F 3/041* (2006.01)

(52) U.S. Cl.
CPC .......... *G06F 3/0412* (2013.01); *G06F 3/0416* (2013.01); *G06F 3/0418* (2013.01); *G06F 2203/04107* (2013.01)

(58) Field of Classification Search
CPC ........ G06F 3/044; G06F 3/041; G06F 3/0412; G06F 2203/041; G06F 3/03547;

(Continued)

(56) References Cited

U.S. PATENT DOCUMENTS 6,310,611 B1* 10/2001 Caldwell .............. H03K 17/955
                                                              178/18.06
8,243,027 B2*  8/2012 Hotelling ............ G02F 1/13338
                                                              345/104

(Continued)

FOREIGN PATENT DOCUMENTS

CN         101968702 A     2/2011
CN         102375638 A     3/2012

(Continued)

OTHER PUBLICATIONS

Office Action for U.S. Appl. No. 14/726,062, dated Jul. 22, 2015, 23 Pages.

(Continued)

*Primary Examiner* — Grant Sitta
(74) *Attorney, Agent, or Firm* — Fenwick & West LLP

(57) ABSTRACT

In a touch display device, a controller generates a touch sync signal for controlling timing of a touch sensing period and a display period in each of a plurality of frames. A touch panel has a plurality of touch electrodes in a display area to generate touch sensing signals indicating whether or not a touch occurs during the touch sensing period. A touch sensing circuit supplies a touch drive signal to the plurality of touch electrodes during the touch sensing period and detects if the touch occurred based on the touch sensing signals received from the plurality of touch electrodes. A touch assistance line surrounds the display area and is disposed in the non-display area of the touch panel. A touch assistance signal supply circuit generates a touch assistance signal on the touch assistance line. The touch assistance signal mimics the touch drive signal during the touch sensing period.

24 Claims, 5 Drawing Sheets

(58) Field of Classification Search
CPC .... G06F 3/0414; G06F 3/0416; G06F 3/0418; G06F 3/046; G06F 3/047; G06F 2203/013; G06F 2203/014; G06F 2203/015; G06F 2203/04107; H05K 9/0073; H05K 9/0079; H05K 9/0081; H05K 9/0088; G09G 2300/0421; G09G 2300/0426
USPC .................................................. 345/173, 76
See application file for complete search history.

(56) References Cited

U.S. PATENT DOCUMENTS

| | | | |
|---|---|---|---|
| 8,743,300 B2* | 6/2014 | Chang | G06F 3/0412 349/12 |
| 9,285,913 B1* | 3/2016 | Kang | G06F 3/0412 |
| 2009/0045733 A1* | 2/2009 | Suh | H01L 27/3276 313/504 |
| 2009/0167720 A1* | 7/2009 | Geaghan | G01D 5/24 345/174 |
| 2009/0268145 A1* | 10/2009 | Anjo | G02F 1/134363 349/141 |
| 2011/0018560 A1* | 1/2011 | Kurashima | G06F 3/044 324/679 |
| 2012/0044203 A1* | 2/2012 | Ishizaki | G06F 3/0412 345/174 |
| 2012/0050217 A1* | 3/2012 | Noguchi | G06F 3/0412 345/174 |
| 2012/0062511 A1* | 3/2012 | Ishizaki | G06F 3/044 345/174 |
| 2012/0075214 A1* | 3/2012 | Kim | G06F 3/041 345/173 |
| 2012/0075237 A1 | 3/2012 | Ikeda et al. | |
| 2012/0081328 A1 | 4/2012 | Kandziora et al. | |
| 2012/0313381 A1 | 12/2012 | Ge et al. | |
| 2013/0016065 A1* | 1/2013 | Reynolds | G06F 3/0412 345/174 |
| 2013/0093706 A1* | 4/2013 | Kurasawa | G06F 3/0412 345/173 |
| 2013/0162560 A1 | 6/2013 | Sun et al. | |
| 2013/0321296 A1 | 12/2013 | Lee et al. | |
| 2014/0071062 A1* | 3/2014 | Fang | G06F 3/0416 345/173 |

FOREIGN PATENT DOCUMENTS

| | | |
|---|---|---|
| CN | 102804114 A | 11/2012 |
| CN | 203386163 U | 1/2014 |
| TW | 201316220 A | 4/2013 |
| WO | WO 2013/056472 A1 | 4/2013 |

OTHER PUBLICATIONS

Office Action for Taiwanese Patent Application No. TW 104144390, dated Nov. 22, 2016, 19 Pages.
$2^{nd}$ Office Action for Taiwanese Patent Application No. TW 104144390, dated Jun. 6, 2017, 25 Pages.

* cited by examiner

DISPLAY DEVICE AND DRIVING METHOD THEREOF

CROSS-REFERENCE TO RELATED APPLICATIONS

This application is a continuation application under 35 U.S.C. § 120 of U.S. patent application Ser. No. 14/726,062 filed on May 29, 2015, which claims the benefit of the Korean Patent Application No. 10-2014-0196073 filed on Dec. 31, 2014, both of which are hereby incorporated by reference as if fully set forth herein.

BACKGROUND

Field of the Invention

The present invention relates to a display device and a driving method thereof, and particularly, to a display device with a built-in touch panel and a driving method thereof.

Discussion of the Related Art

Touch panels are a type of input device that is included in display devices such as liquid crystal display (LCD) devices, plasma display panels (PDPs), organic light emitting display device (OLED), and electrophoretic displays (EPDs), and enables a user to input information by directly touching a screen with a finger, a pen or the like while looking at the screen of the display device.

Particularly, the demand for display devices integrated with an in-cell touch screen, which include a plurality of built-in elements configuring the touch screen for slimming portable terminals such as smart phones and tablet personal computers (PCs), is recently increasing.

FIG. 1 is an exemplary diagram showing waveforms of various signals applied to a related art in-cell display device. FIG. 2 is an exemplary diagram illustrating a configuration of a panel applied to the related art in-cell display device.

In the related art in-cell display device, as shown in FIG. 1, an image display period D and a touch sensing period T are divided by a touch sync signal TSS.

During the image display period D, as shown in FIG. 1, a gate pulse is sequentially supplied to a plurality of gate lines GL1 to GLg, and a common voltage is supplied to a plurality of touch electrodes TE used as a common electrode. Data voltages are respectively supplied to a plurality of data lines DL.

During the touch sensing period T, a touch drive signal is supplied to the touch electrodes TE, and thus, a touch is sensed. In this case, as shown in FIG. 1, touch assistance signals which are the same as or mimics the touch drive signal are supplied to the gate lines GL1 to GLg and the data lines DL.

By using the above-described driving method, loads of the touch electrodes TE are reduced, and touch sensitivity is enhanced.

For example, during the touch sensing period T, the touch assistance signals having the same level and phase as those of the touch drive signal is supplied to the gate lines GL1 to GLg and the data lines DL, and thus, a parasitic capacitance is not generated between the touch electrodes and the gate lines GL1 to GLg and data lines DL. Accordingly, touch sensitivity is enhanced.

However, in a case where the above-described driving method is applied, a touch sensor disposed at an outer portion of the panel has a condition which differs from that of a touch sensor disposed inside the panel.

For example, in FIG. 2, seven touch electrodes disposed at a left outer portion of a panel 10, seven touch electrodes disposed at a right outer portion of the panel 10, eleven touch electrodes disposed at an upper outer portion of the panel 10, and eleven touch electrodes (hereinafter simply referred to as an edge touch electrode TE1) disposed at a lower outer portion of the panel 10 are not adjacent to another touch electrode in at least one of up, down, left, and right directions.

However, in FIG. 2, a touch electrode (hereinafter simply referred to as a center touch electrode TE2) disposed inside the panel 10 is adjacent to other touch electrodes in all directions.

Moreover, an arrangement structure of data lines and gate lines which affect the edge touch electrode TE1 differs from an arrangement structure of data lines and gate lines which affect the center touch electrode TE2.

Therefore, a touch drive signal supplied to the edge touch electrode TE1 has a characteristic different from that of a touch drive signal supplied to the center touch electrode TE2 even when the touch drive signal is supplied to the edge touch electrode TE1 during the touch sensing period T and the touch assistance signals corresponding to the touch drive signal are supplied to the data lines and the gate lines.

Particularly, various lines such as a common voltage supply line, a high voltage supply line, and an antistatic line are disposed outside the edge touch electrode TE1, namely, in a non-display area.

Therefore, a parasitic capacitance is generated between the lines and the edge touch electrode TE1 and affects a touch performance of the edge touch electrode TE1.

For this reason, in comparison with the center touch electrode TE2, a touch sensitivity and a characteristic of the edge touch electrode TE1 are reduced, and a touch sensing ability and a touch performance of a display device are affected.

SUMMARY

In a first embodiment of a touch display device, a controller generates a touch sync signal for controlling timing of a touch sensing period and a display period in each of a plurality of frames, where the touch sensing period and the display period alternate with each other. A touch panel has a display area and a non-display area surrounding the display area. The touch panel has a plurality of touch electrodes in the display area to generate touch sensing signals indicating whether or not a touch occurs during the touch sensing period. A touch sensing circuit supplies a touch drive signal to the plurality of touch electrodes during the touch sensing period and detects if the touch occurred based on the touch sensing signals received from the plurality of touch electrodes. A touch assistance line surrounds the display area and is disposed in the non-display area of the touch panel. A touch assistance signal supply circuit generates a touch assistance signal on the touch assistance line. The touch assistance signal mimics the touch drive signal during the touch sensing period.

In a second embodiment, a method for operating the touch display device described above is provided In a third embodiment a touch display device includes a touch panel having a display area and a non-display area surrounding the display area in which the touch panel has a plurality of touch electrodes in the display area to generate touch sensing signals indicating whether or not a touch occurs during a touch sensing period. The plurality of touch electrodes include center touch electrodes and edge touch electrodes disposed at edges of the display area between the center touch electrodes and the non-display area. A touch sensing circuit supplies a touch drive signal to the plurality of edge touch electrodes and to detect if the touch occurred based on the touch sensing signals received from the plurality of touch electrodes. A touch assistance line in the non-display area of the touch panel supplies a touch assistance signal during a touch sensing period. The touch assistance signal mimics the touch drive signal applied to the edge touch electrodes during the touch sensing period.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings. For convenience of a description, an LCD device will be described below as an example of the present invention, but the present invention is not limited thereto. That is, the present invention may be applied various display devices that display an image by using a common electrode and a common voltage.

Figure 1:
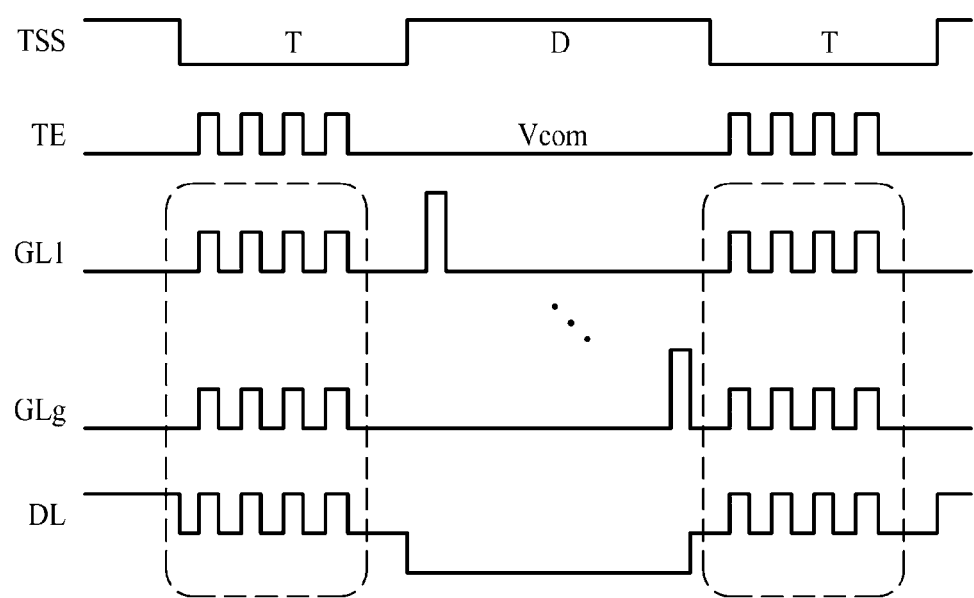
FIG. 1 is an exemplary diagram showing waveforms of various signals applied to a related art in-cell display device.
Figure 2:
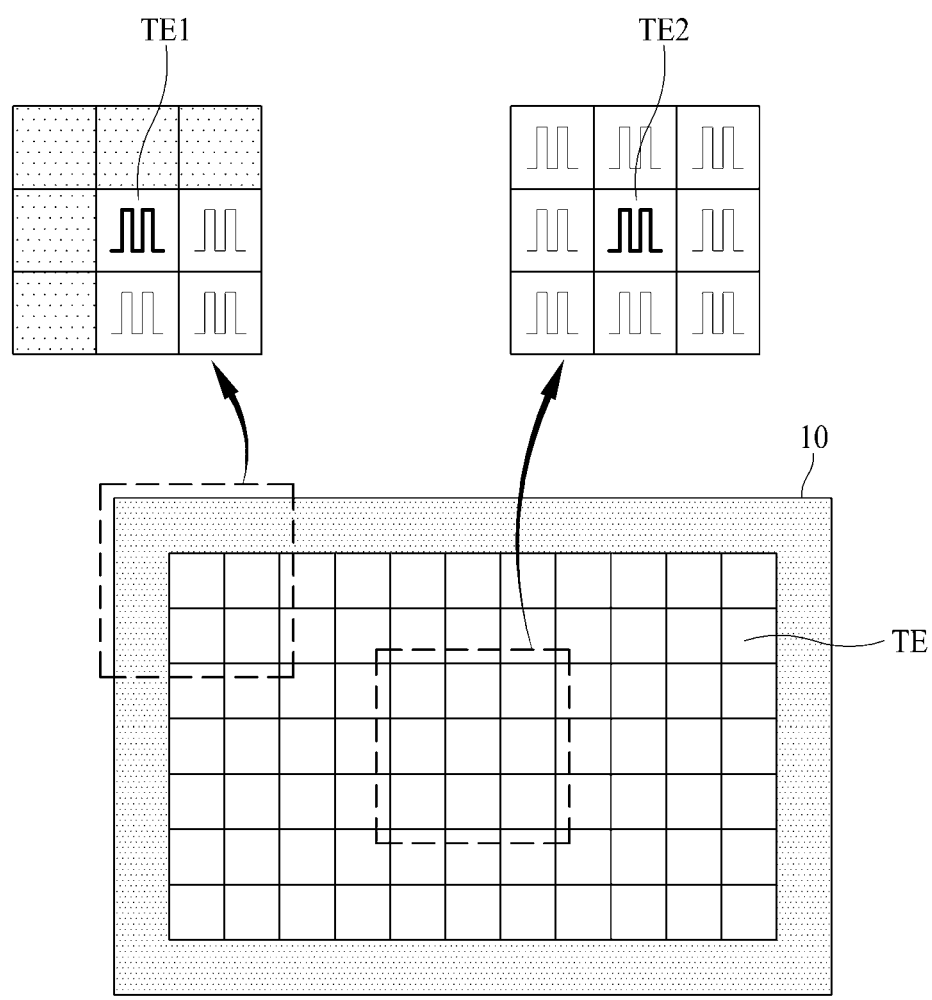
FIG. 2 is an exemplary diagram illustrating a configuration of a panel applied to the related art in-cell display device.
Figure 3:
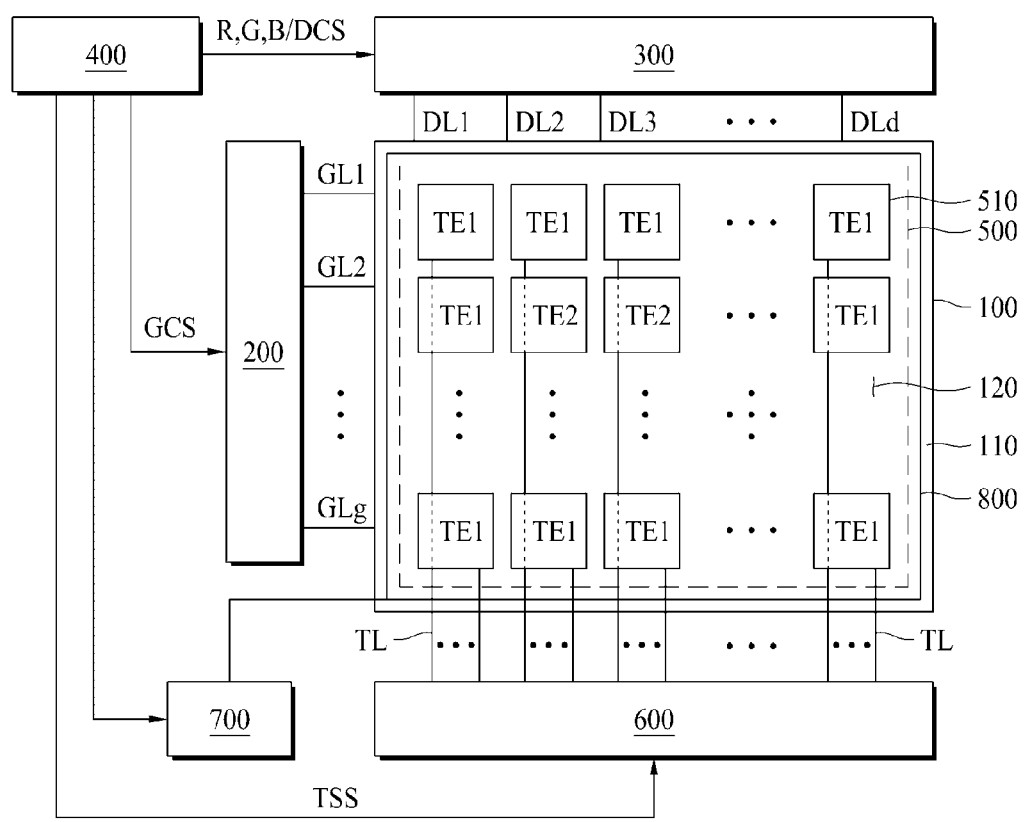
FIG. 3 is an exemplary diagram illustrating a configuration of a display device according to an embodiment of the present invention.

FIG. 3 is an exemplary diagram illustrating a configuration of a display device according to an embodiment of the present invention.

As illustrated in FIG. 3, the display device according to an embodiment of the present invention includes: a panel 100 in which a plurality of touch electrodes 510 are disposed in a display area 120, and a touch assistance line 800, to which the same signal as a touch drive signal supplied to the touch electrodes 510 is supplied during a touch sensing period, is disposed in a non-display area 110 disposed outside the display area 120; a touch sensing unit 600 (e.g., a circuit) that supplies a common voltage to the touch electrodes 510 during an image display period and supplies the touch drive signal to the touch electrodes 510 during the touch sensing period to determine whether the panel 100 is touched; and a touch assistance signal supply unit 700 (e.g., a circuit) that supplies an assistance signal, which is the same as the touch drive signal, to the touch assistance line 800 during the touch sensing period. Here, during the touch sensing period, the assistance signal which is the same as the touch drive signal may be supplied to a plurality of gate lines GL1 to GLg and a plurality of data lines DL1 to DLd which are disposed in the panel 100.

The panel 100 may include a color filter (CF) substrate, a thin film transistor (TFT) substrate where the gate lines and the data lines are provided, and a liquid crystal that is injected between the CF substrate and the TFT substrate.

A touch panel 500 including the touch electrodes 510 may be built into the panel 100. Here, each of the touch electrodes 510 configuring the touch panel 500 may act as a common electrode, which receives a common voltage, and a touch electrode which receives a touch drive signal.

For example, during an image display period, the common voltage may be supplied to the touch electrodes 510, data voltages may be respectively supplied to a plurality of pixel electrodes, which are respectively provided in a plurality of pixels, through the data lines, and the gate pulse may be supplied to the gate lines. For example, each of the gate lines corresponds to a row of pixels and each of the data lines corresponds to a column of pixels. When the gate pulse is supplied, the liquid crystal may be driven by a difference voltage between the common voltage and a data voltage supplied to each of the pixel electrodes. Particularly, the touch panel displays respective rows of an image during the display period based on a difference between the data voltages on the data lines and a common voltage when the gate pulses for respective ones of the gate lines corresponding to the respective rows are supplied. A transmittance of the liquid crystal may be changed according to the difference voltage, and thus, an image may be displayed by the panel 100.

During the touch sensing period, the touch drive signal may be supplied to the touch electrodes 510. In this case, by using a plurality of touch sensing signals respectively received from the touch electrodes 510, the touch sensing unit 600 may determine whether there is a touch or detect a touched position.

In order to perform the above-described function, the TFT substrate may include the gate lines GL1 to GLg, the data lines DL1 to DLd, the touch electrodes 510, and the pixel electrodes (not shown).

Particularly, the touch electrodes 510 may be disposed in the display area 120 which is an area where an image is displayed in the panel 100.

The CF substrate may include a red color filter, a green color filter, and a blue color filter that divide a red pixel, a green pixel, and a blue pixel.

As described above, the touch panel 500 may include the touch electrodes 510.

The touch electrodes 510 may be disposed in the display area 120.

Each of the touch electrodes 510 may be connected to the touch sensing unit 600 through a touch electrode line TL.

During the touch sensing period, the touch drive signal may be supplied to the touch electrodes 510. During the image display period, the common voltage may be supplied to the touch electrodes 510.

The touch electrodes 510 may be built into the panel 100 in an in-cell type.

Among the touch electrodes 510, as illustrated in FIG. 3, a touch electrode disposed outside the display area may be referred to as an edge touch electrode TE1.

Moreover, among the touch electrodes 510, a touch electrode disposed in the display area may be referred to as a center touch electrode TE2.

The edge touch electrode TE1 may not be adjacent to another touch electrode in at least one of up, down, left, and right directions.

A controller 400 may receive a plurality of timing signals, such as a data enable signal DE, a dot clock CLK, etc., from an external system to generate a plurality of control signals GCS and DCS for controlling operation timings of a data driver 300 and a gate driver 200. Also, the controller 400 may realign input video data received from the external system to output realigned image data to the data driver 300.

Moreover, the controller 400 may generate a control signal (for example, a touch sync signal TSS) for controlling operation timings of an input and an output of the touch sensing unit 600 and transfer the controls signal to the touch sensing unit 600.

The touch sensing unit 600 may distinguish the image display period and the touch sensing period according to the touch sync signal TSS. Particularly, the touch sync signal TSS controls timing of the touch sensing signal and the display period in each of a plurality of frames, with the touch sensing period and the display period alternating with each other.

Moreover, the controller 400 may generate a control signal for controlling the touch assistance signal supply unit 700 and transfer the control signal to the touch assistance signal supply unit 700.

The touch assistance signal supply unit 700 may generate the touch assistance signal and transfer the touch assistance signal to the touch assistance line 800 according to the control signal transferred from the controller 400.

The touch assistance signal may have the same level and phase as those of the touch drive signal.

The touch assistance signal may supply the touch assistance signal to the gate driver 200 and the data driver 300.

During the image display period, the data driver 300 may convert image data, input from the controller 400, into analog data voltages and may respectively supply data voltages for one horizontal line to the data lines at every one horizontal period where the gate pulse is supplied to one gate line. For example, the data driver 300 may convert the image data into the data voltages by using gamma voltages supplied from a gamma voltage generator (not shown), and then may respectively output the data voltages to the data lines during the image display period.

The data driver 300 may supply the touch assistance signal to the data lines during the touch sensing period.

In this case, the data driver 300 may autonomously generate the touch assistance signal and supply the touch assistance signal to the data lines.

Moreover, the data driver 300 may supply the touch assistance signal, supplied from the touch assistance signal supply unit 700, to the data lines. In this case, the data driver 300 may include a data switch. The data switch may connect the touch assistance signal supply unit 700 or a data voltage output unit (e.g., a circuit), which outputs the data voltages, to a corresponding data line.

The gate driver 200 may shift a gate start pulse transferred from the controller 400 according to a gate shift clock to sequentially supply the gate pulse during a gate pulse period having a gate high voltage VGH to the gate lines GL1 to GLg.

Moreover, the gate driver 200 may supply a gate low voltage VGL to the gate lines GL1 to GLg during the other period where the gate pulse is not supplied.

The gate driver 200 may supply the touch assistance signal to the gate lines during the touch sensing period.

In this case, the gate driver 200 may autonomously generate the touch assistance signal and supply the touch assistance signal to the gate lines.

Moreover, the gate driver 200 may supply the touch assistance signal, supplied from the touch assistance signal supply unit 700, to the gate lines. In this case, the gate driver 200 may include a gate switch. The gate switch may connect the touch assistance signal supply unit 700 or a gate pulse output unit, which outputs the gate pulse, to a corresponding gate line.

Hereinabove, the data driver 300, the gate driver 200, and the controller 400 have been described as being separately provided. However, at least one of the data driver 300 and the gate driver 200 may be integrated into the controller 400.

The touch sensing unit 600 may determine whether the panel 100 is touched and detect a touched position by using the touch sensing signals respectively received from the touch electrodes 510.

To this end, when the touch sensing period arrives, the touch sensing unit 600 may transfer the touch drive signal to the touch electrodes 510.

In this case, the touch sensing unit 600 may determine whether the panel 100 is touched and detect a touched position by using the touch sensing signals respectively received from the touch electrodes 510.

Moreover, the touch sensing unit 600 may supply the common voltage to the touch electrodes 510 during the image display period.

To this end, the touch sensing unit 600 may connect the touch electrode line TL, connected to the touch electrode 510, to a common voltage supply unit which supplies the common voltage or a touch drive signal supply unit (e.g., a circuit) which supplies the touch drive signal.

The touch drive signal supply unit and the common voltage supply unit may be included in the touch sensing unit 600 or may be provided independently from the touch sensing unit 600.

Moreover, the common voltage may be supplied to the touch electrodes 510 via another path without passing through the touch sensing unit 600.

The touch sensing unit 600 may be included in the controller 400 or the data driver 300.

The touch assistance line 800 may be disposed in the non-display area 110 and may surround the display area 120.

During the image display period, the touch assistance line 800 may be one selected from a common voltage supply line to which the common voltage is supplied, a gate low voltage supply line to which the gate low voltage VGL is supplied, a gate high voltage supply line to which the gate high voltage VHL is supplied, and an antistatic line which is disposed for preventing static electricity.

Therefore, a separate design and process are not needed for disposing the touch assistance line 800 in the panel 100.

During the image display period, one selected from the common voltage, the gate low voltage of the gate pulse supplied to the gate line, the gate high voltage of the gate pulse, and an antistatic signal may be supplied to the touch assistance line 800.

Figure 4:
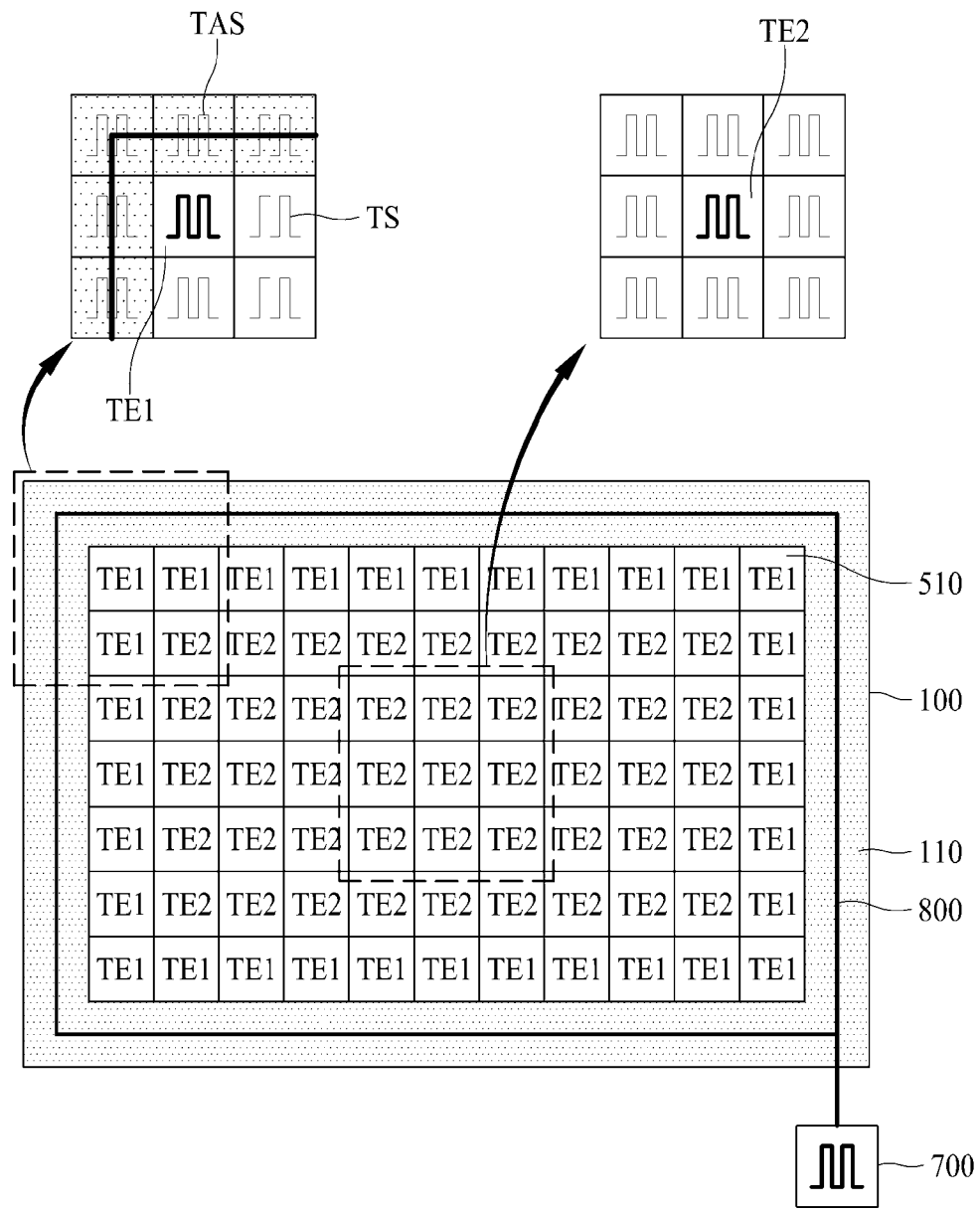
FIG. 4 is an exemplary diagram illustrating a method of supplying a touch drive signal and a touch assistance signal to a display device according to an embodiment of the present invention.

FIG. 4 is an exemplary diagram illustrating a method of supplying a touch drive signal and a touch assistance signal to a display device according to an embodiment of the present invention.

In the display device according to an embodiment of the present invention, the image display period and the touch sensing period may be divided by the touch sync signal.

During the image display period, the gate pulse may be sequentially supplied to the gate lines GL1 to GLg, and the common voltage may be supplied to the touch electrodes 510 used as the common electrodes. In this case, the data voltages may be respectively supplied to the data lines DL.

During the touch sensing period, as illustrated in FIG. 4, the touch drive signal TS may be supplied to the touch electrodes 510, and thus, a touch may be sensed. In this case, a plurality of the touch assistance signals TAS which are the same as the touch drive signal may be supplied to the gate lines GL1 to GLg and the data lines DL.

According to the above-described driving method, loads of the touch electrodes 510 are reduced, and thus, touch sensitivity is enhanced.

For example, during the touch sensing period, the touch assistance signal having the same level and phase as those of the touch drive signal may be supplied to the gate lines GL1 to GLg and the data lines DL, and thus, a parasitic capacitance is not generated between the touch electrodes and the gate lines GL1 to GLg and data lines DL. Accordingly, touch sensitivity is enhanced.

Particularly, according to the present embodiment, the touch assistance signal may be supplied to the touch assistance line 800, which is disposed in the non-display area 100 and surrounds the touch electrodes 510, during the touch sensing period.

For example, in FIG. 4, the touch assistance line 800 may be disposed outside seven edge touch electrodes TE1 disposed at a left outer portion of the panel 100, seven edge touch electrodes TE1 disposed at a right outer portion of the panel 100, eleven edge touch electrodes TE1 disposed at an upper outer portion of the panel 100, and eleven edge touch electrodes TE1 disposed at a lower outer portion of the panel 100.

In this case, during the touch sensing period, the touch assistance signal may be supplied to a plurality of data lines and a plurality of gate lines which are disposed in an area where the center touch electrode TE2 is disposed, and the touch assistance signal may be supplied to the touch assistance line 800 disposed near the edge touch electrode TE1.

Therefore, a load applied to the edge touch electrode TE1 and a load applied to the center touch electrode TE2 may have the same value or a similar value.

For example, when the touch assistance signal TAS having the same form as that of the touch drive signal TS is applied to the data lines, the gate lines, and the touch assistance line 800, the edge touch electrodes TE1 and the center touch electrodes TE2 may have an equivalent potential. Therefore, a load applied to the touch electrodes may become 0, thereby removing an influence of a parasitic capacitance.

Accordingly, touch sensitivity and touch performance are enhanced.

Figure 5:
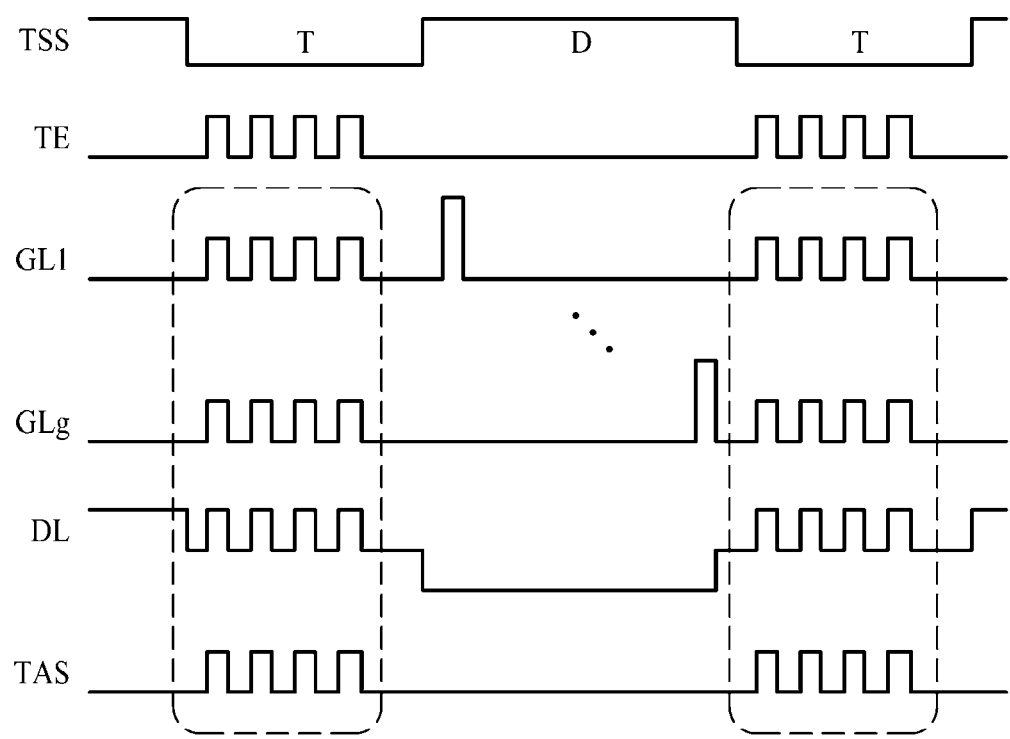
FIG. 5 is an exemplary diagram showing waveforms of various signals applied to a display device according to an embodiment of the present invention.

FIG. 5 is an exemplary diagram showing waveforms of various signals applied to a display device according to an embodiment of the present invention. A method of driving the display device according to an embodiment of the present invention will be described in detail with reference to FIG. 5.

First, during the image display period D, the common voltage may be supplied to the touch electrodes 510 disposed in the display area 120 of the panel 100, and thus, an image may be displayed by the panel 100.

In this case, a data voltage may be supplied to a pixel electrode, included in each of the pixels, through a corresponding data line DL, and the gate pulse may be supplied to a corresponding gate line GL.

When the gate pulse is supplied, the liquid crystal may be driven by a difference voltage between the common voltage and the data voltage supplied to the pixel electrode. A transmittance of the liquid crystal may be changed according to the difference voltage, and thus, an image may be displayed by the panel 100.

Second, during the touch sensing period T, the touch drive signal may be supplied to the touch electrodes (TE) 510.

In this case, the touch assistance signal TAS which is the same as the touch drive signal TS may be supplied to the touch assistance line 800 disposed in the non-display area 110 outside the display area 120, the gate lines GL1 to GLg included in the panel 100, and the data lines DL included in the panel 100.

Features of the present invention will be briefly described below.

In the display device according to the present embodiment, the same signal as the touch drive signal is supplied to the gate lines and the data lines during the touch sensing period, and thus, characteristics of the edge touch electrodes disposed at an outer portion of the panel are improved.

As described in the background, in the related art display device, the number of touch electrodes disposed near the edge touch electrode TE1 is small in comparison with the center touch electrode TE2. In this case, a characteristic of the center touch electrode TE2 differs from that of the edge touch electrode TE1.

To solve such a problem, in the present embodiment, the touch assistance line 800 to which the touch assistance signal having the same form as that of the touch drive signal is supplied during the touch sensing period may be disposed in the non-display area 110 of the panel 100.

The touch assistance signal having the same form as that of the touch drive signal is supplied to the touch assistance line during the touch sensing period, and thus, a characteristic of the edge touch electrode TE1 is the same as or similar to that of the center touch electrode TE2.

For example, when the touch assistance signal having the same form as that of the touch drive signal is applied to the data lines, the gate lines, and the touch assistance line 800, the touch electrodes have an equivalent potential, and a load theoretically becomes 0, thereby removing an influence of a parasitic capacitance.

Accordingly, touch sensitivity and touch performance are enhanced.

The touch assistance line may use one selected from the common voltage supply line to which the common voltage is supplied, the gate low voltage supply line to which the gate low voltage VGL is supplied, the gate high voltage supply line to which the gate high voltage VHL is supplied, and the antistatic line which is connected to a ground or an antistatic circuit for preventing static electricity.

According to the embodiments of the present invention, the touch assistance signal having the same form as that of the touch drive signal is supplied to the touch assistance line during the touch sensing period, and thus, a characteristic of the edge touch electrode is the same as or similar to that of the center touch electrode.

Accordingly, a touch sensitivity and a touch performance of the display device are enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch display device, comprising:
    a controller to generate a touch sync signal for controlling timing of a touch sensing period and a display period in each of a plurality of frames;
    a touch panel having a display area and a non-display area surrounding the display area, the touch panel having a plurality of touch electrodes in the display area to generate touch sensing signals indicating whether or not a touch occurred during the touch sensing period;
    a touch sensing circuit to supply an alternating touch drive signal to one or more of the plurality of touch electrodes during the touch sensing period and to detect if the touch occurred based on the touch sensing signals received from the one or more of the plurality of touch electrodes;
    a touch assistance signal supply circuit to generate an alternating touch assistance signal during the touch sensing period, the alternating touch assistance signal mimicking the alternating touch drive signal during the touch sensing period; and
    a voltage supply line disposed in the non-display area of the touch panel, the voltage supply line disposed outside outer edges of the display area and the voltage supply line at least partially surrounding the plurality of touch electrodes, the voltage supply line supplying a DC voltage during the display period to drive gate pulses onto gate lines of display pixels of the display area, and the alternating touch assistance signal being supplied to the voltage supply line by the touch assistance signal supply circuit during the touch sensing period, wherein the DC voltage is one of a gate low voltage for the gate pulses supplied through a gate low voltage supply line, and a gate high voltage for the gate pulses supplied through a gate high voltage line.

2. The touch display device of claim 1, wherein the alternating touch assistance signal has an approximately same signal level and approximately same phase as the alternating touch drive signal during the touch sensing period.

3. The touch display device of claim 1, further comprising:
    a gate driver to provide the gate pulses to the gate lines of the touch panel during the display period;
    a data driver to provide data voltages to data lines of the touch panel during the display period; and
    wherein each of the gate lines corresponds to a row of pixels and each of the data lines corresponds to a column of pixels in the touch panel, and wherein the touch panel displays respective rows of an image during the display period based on a difference between the data voltages on the data lines and a common voltage when the gate pulses for respective ones of the gate lines corresponding to the respective rows are supplied.

4. The touch display device of claim 3, wherein the data driver is further to supply the alternating touch assistance signal to the data lines during the touch sensing period, and wherein the gate driver is further to supply the alternating touch assistance signal to the gate lines during the touch sensing period.

5. The touch display device of claim 1, wherein the touch sensing circuit is further to supply a common voltage to the plurality of touch electrodes during the display period.

6. The touch display device of claim 1, further comprising:
    an antistatic line providing an antistatic signal to prevent static electricity from interfering with the touch panel during the display period; and
    wherein the alternating touch assistance signal supply circuit further supplies the alternating touch assistance signal to the antistatic line during the touch sensing period.

7. A method for operating a touch display device, the method comprising:
    generating, by a controller, a touch sync signal for controlling timing of a touch sensing period and a display period in each of a plurality of frames;
    supplying, by a voltage supply line disposed in a non-display area surrounding a display area of a touch panel, a DC voltage during the display period to drive gate pulses onto gate lines of display pixels of the display area, the voltage supply line disposed outside outer edges of the display area and the voltage supply line at least partially surrounding a plurality of touch electrodes, wherein the DC voltage is one of a gate low voltage for the gate pulses supplied through a gate low voltage supply line, and a gate high voltage for the gate pulses supplied through a gate high voltage line;
    supplying, by a touch sensing circuit, an alternating touch drive signal to one or more of the plurality of touch electrodes in the display area of the touch panel during the touch sensing period;
    supplying by a touch assistance signal supply circuit, an alternating touch assistance signal on the voltage supply line during the touch sensing period, the alternating touch assistance signal mimicking the alternating touch drive signal;
    receiving, from the one or more of the plurality of touch electrodes, touch sensing signals indicating whether or not a touch occurred during the touch sensing period; and
    detecting, by the touch sensing circuit, if the touch occurred during the touch sensing period based on the touch sensing signals received from the plurality of touch electrodes.

8. The method of claim 7, wherein the alternating touch assistance signal has an approximately same signal level and an approximately same phase as the alternating touch drive signal.

9. The method of claim 7, further comprising:
    sequentially supplying the gate pulses to the gate lines of the touch panel during the display period, wherein each of the gate lines corresponds to a row of pixels in the touch panel;
    providing, by a data driver, data voltages to data lines of the touch panel during the display period, wherein each of the data lines corresponds to a column of pixels in the touch panel;
    displaying by the touch panel during the display period, respective rows of an image based on a difference between the data voltages on the data lines and a common voltage when the gate pulses for respective ones of the gate lines corresponding to the respective rows are supplied.

10. The method of claim 9, further comprising:
providing the alternating touch assistance signal to the gate lines and to the data lines during the touch sensing period.

11. The method of claim 7, further comprising:
supplying, by the touch sensing circuit, a common voltage to the plurality of touch electrodes during the display period.

12. The method of claim 7, further comprising:
providing an antistatic signal on an antistatic line to prevent static electricity from interfering with the touch panel during the display period; and
supplying the alternating touch assistance signal to the antistatic line during the touch sensing period.

13. A driver circuit for driving a touch display device, the driver circuit comprising:
a controller circuit to generate a touch sync signal for controlling timing of a touch sensing period and a display period in each of a plurality of frames;
a touch sensing circuit to supply an alternating touch drive signal to one or more of a plurality of touch electrodes in a display area of a touch panel during the touch sensing period and to detect if a touch occurred during the touch sensing period based on touch sensing signals received from the plurality of touch electrodes;
a power supply circuit to supply a DC voltage during the display period to a voltage supply line disposed in a non-display area of the touch panel surrounding the display area, the voltage supply line disposed outside outer edges of the display area and the voltage supply line at least partially surrounding the plurality of touch electrodes, the DC voltage to drive gate pulses onto gate lines of display pixels of the display area during the display period, wherein the DC voltage is one of a gate low voltage for the gate pulses supplied through a gate low voltage supply line, and a gate high voltage for the gate pulses supplied through a gate high voltage line; and
a touch assistance signal supply circuit to generate an alternating touch assistance signal on the voltage supply line during the touch sensing period, the alternating touch assistance signal mimicking the alternating touch drive signal during the touch sensing period.

14. The driver circuit of claim 13, wherein the alternating touch assistance signal has an approximately same signal level and approximately same phase as the alternating touch drive signal during the touch sensing period.

15. The driver circuit of claim 13, further comprising:
a gate driver circuit to provide the gate pulses to the gate lines of the touch panel during the display period; and
a data driver circuit to provide data voltages to data lines of the touch panel during the display period; and
wherein each of the gate lines corresponds to a row of pixels and each of the data lines corresponds to a column of pixels in the touch panel, and wherein the touch panel displays respective rows of an image during the display period based on a difference between the data voltages on the data lines and a common voltage when the gate pulses for respective ones of the gate lines corresponding to the respective rows are supplied.

16. The driver circuit of claim 15, wherein the data driver is further to supply the alternating touch assistance signal to the data lines during the touch sensing period, and wherein the gate driver is further to supply the alternating touch assistance signal to the gate lines during the touch sensing period.

17. The driver circuit of claim 13, wherein the touch sensing circuit is further to supply a common voltage to the plurality of touch electrodes during the display period.

18. The driver circuit of claim 13, wherein the alternating touch assistance signal supply circuit further supplies the alternating touch assistance signal to an antistatic line during the touch sensing period, the antistatic line to prevent static electricity from interfering with the touch panel during the display period.

19. The touch display device of claim 1, further comprising:
a gate driver to sequentially supply the gate pulses to the gate lines of the touch panel during the display period by alternately driving the gate high voltage from the gate high voltage supply line onto the gate lines for a pulse period of the gate pulse and otherwise driving the gate low voltage from the gate low voltage supply line onto the gate lines, wherein the voltage supply line comprises one of the gate high voltage supply line and the gate low voltage supply line.

20. The method of claim 7, further comprising:
sequentially supplying the gate pulses to the gate lines of a touch panel during the display period by sequentially driving the gate high voltage from the gate high voltage supply line onto the gate lines for a pulse period and otherwise driving the gate low voltage from the gate low voltage supply line onto the gate lines, the gate high voltage supply line and the gate low voltage supply line in the non-display area of the touch panel, wherein the voltage supply line comprises one of the gate high voltage supply line and the gate low voltage supply line.

21. The driver circuit of claim 13, further comprising:
a gate driver to sequentially supply the gate pulses to the gate lines of the touch panel during the display period by alternately driving the gate high voltage from the gate high voltage supply line onto the gate lines for a pulse period of the gate pulse and otherwise driving the gate low voltage from the gate low voltage supply line onto the gate lines, wherein the voltage supply line comprises one of the gate high voltage supply line and the gate low voltage supply line.

22. The touch display device of claim 1, wherein the alternating touch assistance signal periodically switches between a first voltage level and a second voltage level during the touch sensing period, and wherein the voltage supply line supplies the DC voltage for an entirety of the of the display period.

23. The method of claim 7, wherein the alternating touch assistance signal periodically switches between a first voltage level and a second voltage level during the touch sensing period, and wherein the voltage supply line supplies the DC voltage for an entirety of the of the display period.

24. The driver circuit of claim 13, wherein the alternating touch assistance signal periodically switches between a first voltage level and a second voltage level during the touch sensing period, and wherein the voltage supply line supplies the DC voltage for an entirety of the of the display period.

* * * * *